United States Patent [19]

Kubota et al.

[11] Patent Number: 4,794,042
[45] Date of Patent: * Dec. 27, 1988

[54] MAGNETIC RECORDING MEDIUM

[75] Inventors: Yuichi Kubota; Keiji Koga; Kazunori Tamazaki; Tsutomu Aoyama, all of Nagano; Akio Watanabe, Miyagi, all of Japan

[73] Assignee: TDK Corporation, Tokyo, Japan

[*] Notice: The portion of the term of this patent subsequent to Dec. 30, 2003 has been disclaimed.

[21] Appl. No.: 917,224

[22] Filed: Oct. 9, 1986

[30] Foreign Application Priority Data

| Oct. 9, 1985 [JP] | Japan | 60-225673 |
| Oct. 11, 1985 [JP] | Japan | 60-226087 |
| Oct. 12, 1985 [JP] | Japan | 60-227267 |

[51] Int. Cl.$^4$ .............................................. G11B 5/70
[52] U.S. Cl. .................... 428/328; 252/62.54; 427/44; 427/128; 428/403; 428/407; 428/408; 428/329; 428/694; 428/900
[58] Field of Search ............... 428/328, 329, 694, 695, 428/403, 407, 408, 900; 252/62.56; 360/134–136; 427/128, 131, 44

[56] References Cited

U.S. PATENT DOCUMENTS

| 4,092,459 | 5/1978 | Deffeyes et al. | 428/900 |
| 4,137,361 | 1/1979 | Deffeyes | 428/328 |
| 4,218,507 | 8/1980 | Deffeyes | 428/328 |
| 4,347,165 | 8/1982 | Matheson | 428/408 |
| 4,554,217 | 11/1985 | Grimm | 428/469 |
| 4,632,866 | 12/1986 | Kubota | 428/900 |

FOREIGN PATENT DOCUMENTS

| 0095191 | 11/1983 | European Pat. Off. . |
| 0155532 | 9/1985 | European Pat. Off. . |
| 0154903 | 9/1985 | European Pat. Off. . |
| 3026696 | 2/1982 | Fed. Rep. of Germany . |
| 61-196502 | 8/1986 | Japan . |

OTHER PUBLICATIONS

JP-Patents-Abstracts of Japan: P-439, Mar. 25, 1926, vol. 10, No. 74, REF 60-212821.

Primary Examiner—Ellis P. Robinson
Attorney, Agent, or Firm—Oblon, Fisher, Spivak, McCelland & Maier

[57] ABSTRACT

A magnetic recording medium wherein a magnetic layer containing a particulate magnetic material and a binder is formed on a substrate exhibits improved performance as magnetic recording tape, disk, and sheet when the particulate magnetic material comprises particles having iron carbide at least on the surface thereof and optional oxide particles, and the particulate magnetic material contains 5 to 90% by weight of iron carbide in the form of $Fe_nC$.

3 Claims, 2 Drawing Sheets

MAGNETIC RECORDING MEDIUM

BACKGROUND OF THE INVENTION

This invention relates to coated type magnetic recording media, and more particularly, to an improvement in the composition of particulate magnetic material used in a magnetic layer of magnetic recording media. The magnetic recording media to which this invention pertains include magnetic recording tapes for audio and video applications and magnetic sheets or disks to be loaded in a magnetic sheet operating device such as an electronic or electromagnetic camera for recording magnetic signals on the sheet.

In these years, a variety of magnetic articles of manufacture have been commercially utilized including high performance audio cassette tape, video tape, computer tape, multi-coated tape, magnetic disks, floppy disks, magnetic cards, and the like as symbolically represented by the commercial success of home VCR units. Active work has been addressed to the development of new particulate magnetic materials useful for such magnetic recording media.

One typical example of particulate magnetic material is needle or acicular iron oxide. The needle iron oxide alone, however, is insufficient to accommodate the need for higher magnetic recording density. Instead, cobalt-coated iron oxide and magnetic metal particles were proposed and have been used in practice in some high performance audio cassette tape, video tape, and various magnetic disks. The majority of video and audio tapes, however, use needle iron oxide. Their problems will be further described.

Needle iron oxide has insufficient magnetic properties including coercive force Hc and maximum saturation magnetization Ms, failing to provide satisfactory output and SN ratio. In order that a magnetic coating have an increased residual magnetization Br, the coating composition must have such a higher content of needle iron oxide powder as to render the coating less durable. A magnetic layer containing needle iron oxide has a high electric resistance and is liable to such inconvenience as dropout. Addition of an antistatic agent such as carbon to a magnetic layer can reduce the electric resistance of the layer at the sacrifice of the residual magnetization Br, output, and SN ratio of the layer.

Cobalt-coated iron oxide particles have insufficient magnetic properties as exemplified by a low maximum saturation magnetization Ms and easy demagnetization. They have an electric resistance insufficient to prevent dropout increase during repeated operation and are less durable.

Magnetic metal particles also have many problems including low abrasion resistance, marked deterioration during service, and oxidation susceptibility. Even after incorporated in a magnetic recording medium, there still occurs a reduction of magnetic flux density, resulting in an output drop.

When a magnetic recording medium having magnetic metal particles is operated across a magnetic head of Sendust or amorphous metal material, there often occurs so-called "seizing". That is, a lusterless discolored layer is formed on the head surface, the layer being of different color from the remaining head material. It is believed that the seizing is a chemical and physical quality change of Sendust or amorphous metal material on the surface due to the sliding contact between the magnetic recording medium and the magnetic head.

Another problem is associated with a process of forming magnetic recording media using magnetic metal particles. It is imperative that an oxide coating is formed on the surface of magnetic metal particles during handling. As the case may be, an oxide coating is intentionally formed.

Magnetic recording media using magnetic metal particles having an oxide coating formed on the surface thereof have the advantages that they do not undergo a reduction in magnetic flux density due to the influence of ambient conditions, for example, temperature and humidity or a deterioration in properties due to rust formation in the magnetic layer. However, since the surface oxide coating provides an increased electrical resistance, the magnetic recording medium tends to be electrically charged at the surface so that foreign matter will adhere to the surface, causing dropouts. Further, electric charges upon exfoliating cause discharge noises. All these factors detract from tape performance.

Magnetic sheets capable of recording magnetic signals representative of a still image in an annular track are known in the art. It is a common practice to accommodate such a magnetic sheet in a jacket for convenience of handling and storage. The magnetic sheet comprises a flexible substrate and a magnetic layer formed thereon. Usually, a pair of magnetic layers are coated on the opposed surfaces of the substrate partially for the purpose of preventing the sheet from warping.

On use, a magnetic sheet is mounted on a drive shaft of a magnetic sheet operating device and rotated at a high speed, for example, at 3,600 rpm. While the sheet is being rotated, a magnetic head is forced against the sheet to perform recording and reproducing operations on the sheet. A stabilizer member holds the opposite surface of the sheet to control the degree of contact between the sheet and the head. In this way, recording/reproducing operation is performed on the magnetic sheet in an electronic camera while the sheet is rotated at a high speed and pressed with a sufficient force to induce deformation. Thus the magnetic sheet must be highly durable.

For the same reason, an output of reproduction from the magnetic sheet somewhat depends on the relative location of the head and the quantity of deformation of the sheet. Output varies with the degree of contact between the head and the sheet. Thus the magnetic sheet must also have appropriate rigidity or stiffness. Because of the above-mentioned operation mode, the magnetic sheet simultaneously undergoes high speed sliding motion by rotation and deformation by bending. That is, the magnetic sheet experiences a unique mechanical fatigue of different type from those of conventional magnetic tape and disk.

There is a strong need for a magnetic sheet satisfying these considerations.

SUMMARY OF THE INVENTION

It is, therefore, an object of the present invention to provide a novel and improved magnetic recording medium which is highly antistatic, thus free from an output reduction due to the addition of an antistatic agent, oxidation resistant, and free of seizing while providing satisfactory magnetic properties.

Another object of the present invention is to provide a magnetic redording medium in the form of a magnetic disk having improved durability, oxidation resistance and antistatic nature free of any output reduction due to the addition of an antistatic agent, and characterized by a high recording density.

A further object of the present invention is to provide a novel and improved magnetic sheet having high durability and excellent antistatic nature.

According to a first aspect of the present invention, there is provided a magnetic recording medium comprising a substrate and a magnetic layer formed thereon and containing a particulate magnetic material and a binder, characterized in that the particulate magnetic material comprises (a) particles having iron carbide at least on the surface thereof and (b) oxide particles, and the particulate magnetic material contains 5 to 90% by weight of iron carbide.

According to a second aspect of the present invention, there is provided a magnetic recording medium comprising a disk-shaped flexible substrate and a magnetic layer formed thereon and containing a particulate magnetic material and a binder, characterized in that the particulate magnetic material comprises particles having iron carbide at least on the surface thereof and contains 5 to 90% by weight of iron carbide.

According to a third aspect of the present invention, there is provided a magnetic recording medium in the form of a magnetic sheet comprising a disk-shaped substrate having opposed major surfaces and a magnetic layer formed on either major surface of the substrate and containing a particulate magnetic material and a binder; the magnetic sheet being used in a magnetic sheet operating device comprising a magnetic head for performing recording and reproducing operations on the sheet while rotating the sheet and a stabilizer member for controlling the contact of the sheet with the head, characterized in that the particulate magnetic material comprises particles having iron carbide at least on the surface thereof.

BRIEF DESCRIPTION OF THE DRAWINGS

The invention will be more fully understood by reading the following description taken in conjunction with the accompanying drawings, in which.

DETAILED DESCRIPTION OF THE INVENTION

The magnetic recording medium of the present invention has a magnetic recording layer on at least one surface of a substrate. The magnetic layer is comprised of a particulate magnetic material which contains a major proportion of magnetic particles having iron carbide at least on the surface thereof.

In one embodiment, the magnetic recording medium of the invention takes the form of a magnetic recording tape which generally comprises a flexible base film or substrate and a magnetic layer coated thereon. This construction is well known in the art and its detailed explanation is omitted.

In another embodiment, the magnetic recording medium of the invention takes the form of a magnetic recording disk or sheet. The construction of such a disk will be illustrated in order to help understanding of problems associated therewith.

Figure 2:
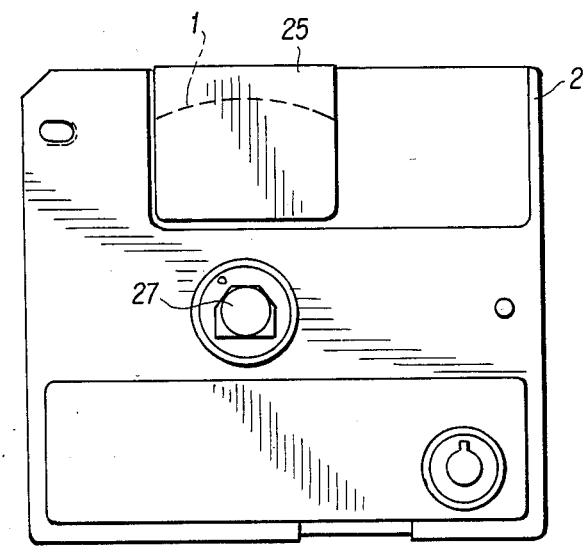
FIG. 2 is a plan view of a jacket having a magnetic sheet received therein.

Referring to FIG. 2, there is illustrated a jacket having a magnetic sheet received therein. A disk-shaped magnetic sheet 1 is received for rotation in a rectangular jacket casing 2. The magnetic sheet 1 is provided with a plurality of annular tracks (not shown) for magnetically recording image signals indicative of still image information. The jacket casing 2 is locally opened to define a window 25 through which part of the magnetic sheet 1 is exposed. The jacket casing 2 also include a central opening corresponding to a central portion of the magnetic sheet 1. The magnetic sheet 1 has at its center a driven hub formed with a driven hole 27.

Figure 1:
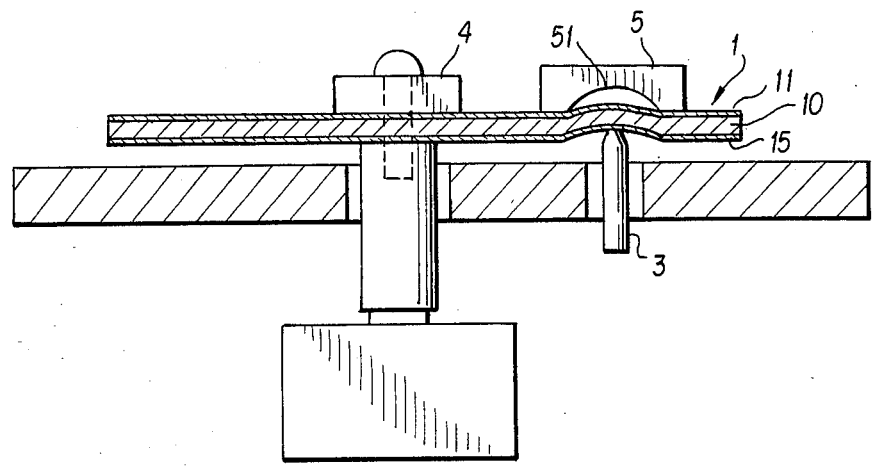
FIG. 1 is a schematic, partially cross sectional, elevation of a magnetic sheet operating device illustrating the operation of a magnetic sheet therein.

On use, a magnetic sheet operating device, typically an electronic camera is loaded with the jacket or sheet. FIG. 1 illustrates the magnetic sheet loaded in the camera while the jacket is omitted for illusration purpose. The camera includes a magnetic head 3, a drive motor, a drive shaft, a chuck 4 associated with the drive shaft, and a stabilizer 5 opposed to the head 3 and having a recess 51 serving as a stabilizing surface. On operation, the magnetic head 3 is moved forward through the jacket window to contact the magnetic sheet 1 whereby a plurality of image signals are magnetically recorded on or reproduced from the sheet 1.

The drive shaft is inserted into the driven hole 27 in the central hub of the sheet and firmly secured to the hub by the chuck 4. The sheet 1 mounted on the drive shaft is rotated at a high speed, for example, at 3600 rpm. While being rotated, the sheet is forced against the head 3. The stabilizer member 5 is brought in contact with the opposite side of the sheet 1 to control the degree of contact between the sheet 1 and the head 3. Under these conditions, recording and reproducing operations are performed on the sheet.

As previously described, the magnetic sheet 1 of the present invention includes a disk-shaped substrate 10 which is coated on both the major surfaces with magnetic layers 11 and 15 partially for the purpose of preventing the sheet from warping. Usually, the substrate is a flexible substrate. No particular limitation is imposed on the flexible materials of which the substrates are made. The preferred flexible materials are flexible synthetic resins such as polyesters, polyimides, polyamides, poly(ethylene-2,6-naphthalate), polyarylates, polysulfones, polycarbonates, aramide resins. Most commonly used are biaxially oriented polyester films.

The substrates for disks generally have a thickness of 30 to 36 $\mu$m, preferably 32 to 34 $\mu$m. Their outer diameter generally ranges from 4.68 cm to 4.71 cm.

A pair of magnetic layers are formed on the opposed major surfaces of the substrate by applying onto the substrate surfaces a magnetic coating composition of a magnetic powder dispersed in a suitable binder.

PARTICULATE MAGNETIC MATERIAL

The magnetic layer according to the present invention has a composition comprising a particulate magnetic material which contains a major proportion of magnetic particles having iron carbide at least on the surface thereof, and a binder.

The magnetic particles having iron carbide at least on the surface thereof (to be referred to as iron carbide particles for brevity sake) may be prepared, for example, by mixing an iron cyanide with a sulfate, sulfite or sulfide, placing the mixture in an iron vessel, and heating the mixture for reduction while introducing carbon monoxide into the vessel, followed by cooling.

They may also be prepared by starting with iron hydroxides such as α-FeOOH (Goethite), β-FeOOH (Akaganite) and γ-FeOOH (Lepidocrocite), etc.; or iron oxides such as $\alpha$-$Fe_2O_3$, $\gamma$-$Fe_2O_3$, $Fe_3O_4$, $\gamma$-$Fe_2O_3$-$Fe_3O_4$ (solid solution), etc.; and reducing the material with carbon monoxide or a gas mixture of hydrogen and carbon monoxide as disclosed in Japanese Patent Application Kokai Nos. 58-171765 and 60-12402.

They may also be prepared by reducing a slurry mixture of these iron oxides in an aqueous colloidal carbon black particle suspension with carbon monoxide or a gas mixture of hydrogen and carbon monoxide. Examples of the iron cyanides used herein include hexacyano iron salts such as Turnbull's blue, Berlin white, etc., and ferro- and ferricyanides such as potassium ferrocyanide, sodium ferrocyanide, potassium ferricyanide, sodium ferricyanide, etc. Examples of the additives include sulfates such as potassium sulfate, sodium sulfate, ammonium sulfate, iron sulfate, sodium hydrogen sulfate, and potassium hydrogen sulfate; sulfites such as potassium sulfite, sodium sulfite, ammonium sulfite, and potassium hydrogen sulfite; and sulfides such as sodium thiosulfate, potassium thiosulfate, sodium sulfide, potassium sulfide, iron sulfide, sodium rhodanide, potassium rhodanide, sodium isothiocyanate, and potassium isothiocyanate.

The gas used in the heat reducing atmosphere is not limited to carbon monoxide (CO), but carbon-bearing reducing gases such as methane, water gas, and propane may also be used. For reduction purpose, a heating temperature of about 300° to 700° C. and a heating time of about 10 hours to about 30 minutes may be employed.

Alternatively, pure iron particles may be formed and then subjected to any of the foregoing heat reducing treatments.

There are thus produced iron carbide particles represented by the formula $Fe_nC$ where n is a number of at least 2, particularly from 2 to 3. Although it is not necessary that n be an integer and the material have a stoichiometric composition, there are often formed $Fe_2C$, $Fe_5C_2$, and $Fe_3C$.

There may occur a somewhat graded concentration in particles. Although it is not necessary that C is present throughout the particle, preferably iron carbide comprises 10 to 100% by weight of the particles.

The aforementioned iron carbide particles may take either needle or spherical form and a choice may be made in accordance with the intended application of the magnetic recording medium. When it is intended to prepare a magnetic tape of the video or audio tape specification, needle iron carbide particles are preferably employed, particularly those particles having a length of 0.2 to 2 μm and a needle ratio (length/breadth) of 2 to 20.

These iron carbide particles are contained in an amount of 5 to 90% by weight of the total weight of the particulate magnetic material in the first and second embodiments of the present invention. Outside this range, the magnetic layer of the present invention is less effective. In the third embodiment, the iron carbide particles comprises 5 to less than 100% by weight of the particulate magnetic material, preferably 5 to 95% by weight, and most preferably from 5 to 90% by weight of the particulate magnetic material. Less than 5% of iron carbide particles is too low to provide durbbility and antistatic effects. The particulate magnetic material consisting solely of iron carbide particles is unsatisfactory in dispersion and durability. The magnetic layer on the substrate may preferably contain 5 to less than 100% by weight of the iron carbide particles. When two magnetic layers are provided on a substrate, they generally have the same content of iron carbide particles, but may have a different content if desired.

In addition to the iron carbide particles, the particulate magnetic material used in the magnetic layer according to the first embodiment of the present invention may further contain oxide particles, typically iron oxide particles such as $\gamma$-$Fe_2O_3$ particles and cobalt-coated iron oxide particles.

The preferred form of $\gamma$-$Fe_2O_3$ particles used herein may be prepared by dehydrating α-FeOOH (goethite) at 400° C. or higher into $\alpha$-$Fe_2O_3$, reducing at 350° C. or higher in hydrogen gas into $Fe_3O_4$, and then oxidizing at 250° C. or lower. Alternatively, γ-FeOOH (lepidocrocite) may be dehydrated, reduced, and oxidized.

The cobalt-coated iron oxide particles used herein may be $\gamma$-$Fe_2O_3$ or $Fe_3O_4$ particles having divalent cobalt cations ($Co^{2+}$) diffused into a very thin surface layer of up to several ten angstroms deep from the surface.

The particulate magnetic material used in the magnetic layer according to the second and third embodiments of the present invention may further contain magnetic metal particles and cobalt-coated iron oxide particles, $\gamma$-$Fe_2O_3$ particles, barium and strontium ferrite particles, and a mixture thereof. The iron oxide particles are as defined above.

The barium ferrites used herein include a hexagonal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc.

Berrium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983). The same applies to strontium ferrites.

The magnetic metal particles used herein include (1) those obtained by starting with iron oxyhydroxides such as α-FeOOH (goethite), β-FeOOH (akaganite), and γ-FeOOH (lepidocrocite); iron oxides such as $\alpha$-$Fe_2O_3$, $\gamma$-$Fe_2O_3$, $Fe_3O_4$, and $\gamma$-$Fe_2O_3$-$Fe_3O_4$ (solid solution;; and iron particles doped with one or more metals selected from Co, Mn, Ni, Ti, Bi, Be, and Ag and having an aluminum or silicon compound adsorbed or applied on their surface, and heat reducing them in a reducing gas stream to produce a magnetic powder consisting of iron or consisting of a major proportion of iron, (2) those obtained by the liquid phase reduction of a metal salt in water with $NaBH_4$, and (3) those obtained by evaporating metals in an inert gas atmosphere under a reduced pressure.

The magnetic metal particles may have a composition consisting essentially of elemental iron, cobalt, and nickel alone, and alloys thereof, and the individual metals and their alloys both having an additional metal added thereto, for example, one or more metals selected from Cr, Mn, Co, and Ni, and optionally, from Zn, Cu, Zr, Al, Ti, Bi, Ag, and Pt.

It is also contemplated to add a minor proportion of a non-metallic element or elements such as B, C, Si, P, and N to these metals. Partially nitrided metal magnetic particles such as Fe$_4$N may also be included.

Also, the magnetic metal particles may have an oxide coating on the surface thereof. The magnetic recording media using magnetic metal particles having an oxide coating are advantageously resistant to any influences of an ambient environment such as a reduction in magnetic flux density due to the influence of temperature and humidity and a deterioration of properties due to the occurrence of rust in the magnetic layer. However, there arises a problem that the magnetic layer has an increased electric resistance which causes troubles due to electric charging during use.

The magnetic metal particles may have either needle or granular form and a proper choice may be made depending upon the intended use of the magnetic recording medium. Needle, that is, acicular form is preferred in the case of floppy disks and magnetic sheets.

Binder

The magnetic coating composition is prepared from the particulate magnetic material with the aid of a binder which may be selected from radiation curable resins, thermoplastic resins, thermosetting resins, and reactive resins, and mixtures thereof. The thermosetting resins and radiation curable resins are preferred because of the strength of the resultant coatings.

The thermoplastic resins used herein are resins having a softening point of lower than 150° C., an average molecular weight of 10,000 to 200,000, and a degree of polymerization of about 200 to 2,000.

The thermosetting and reactive resins used herein have a similar degree of polymerization. Upon heating after coating and drying, they are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/-triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloride-vinyl alcohol-vinyl acetate copolymer (which may have carboxylic units incorporated therein), a vinyl chloride-vinylidene chloride copolymer, chlorinated polyvinyl chloride, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadieneacrylonitrile, etc.; and mixtures of any of the foregoing members.

These thermosetting resins may generally be cured by heating in an oven at about 50° to 80° C. for about 6 to 100 hours. Alternatively, they may be slowly transferred through an oven at 80° to 120° C.

Among the preferred binders are radiation-curable resins, that is, resins obtained by partially curing a radiation-curable compound.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizaing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U.C.C.), and analogues. These copolymers may be modified to be radiation sensitive by incorporating acrylic, maleic, or allyl double bonds. They may additionally contain carboxylic units.

(2) Saturated polyesater resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with SO₃Na or the like, for example, Vyron 53S (trade name, Toyobo K.K.). They may be modified to be radiation sensitive.

(3) Polyvinyl alcohol resins

Included are polyvinyl alcohol, butyralresins, acetal resins, formal resins, and copolymers of such units. They may be modified to be radiation sensitive by acting on a hydroxyl group in them.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trad names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins. These resins maybbe modified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, hydroxyl-containing acrylic esters, and acrylic resins containing at least one methacrylate as a polymer component.

Examples of the elastomers and prepolymers are presented below.

(i) Polyurethane elastomers, prepolymers and oligomers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH termina group as a polar group.

Also included are monomers having active hydrogen capable of reacting with an isocyanate group and an unsaturated double bond capable of radiation curing, for example, mono- and diglycerides of long chain fatty acids having an unsaturated double bond.

(ii) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capalle of generating a radical upon exposure to radiation to facilitate crosslinking and polymerization.

(iii) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K. may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacylate, polyfunctional oligoester acrylates (e. g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

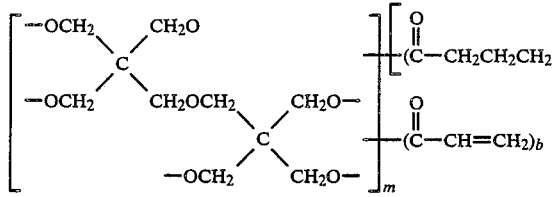

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

$(CH_2=CHCOOCH_2)_3-CCH_2OH$ (1)
(Special acrylate A)
$(CH_2=CHCOOCH_2)_3-CCH_2CH_3$ (2)
(Special acrylate B)
$[CH_2=CHCO(OC_3H_6)_n-OCH_2]_3-CCH_2CH_3$ (3)
(Special acrylate C)

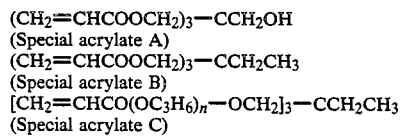

(Special acrylate D)

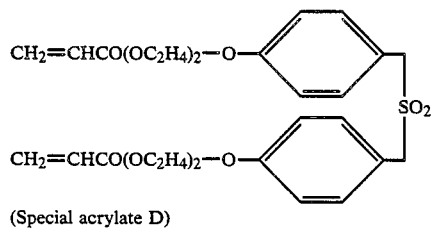

(Special acrylate E)

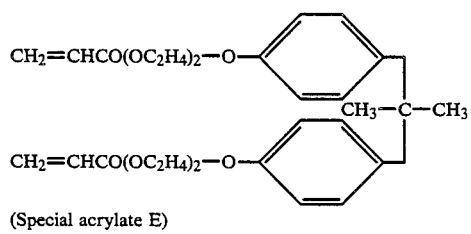

(Special acrylate F)

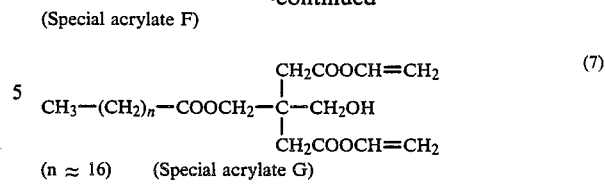

(n ≈ 16)   (Special acrylate G)

$CH_2=CHCOO-(CH_2CH_2O)_4-COCH=CH_2$ (8)
(Special acrylate H)

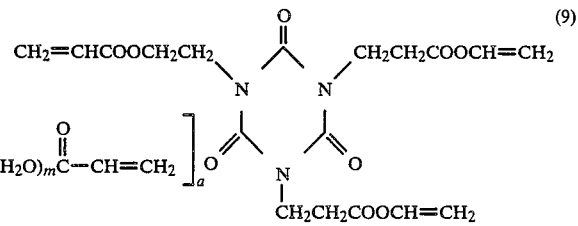

(Special acrylate I)

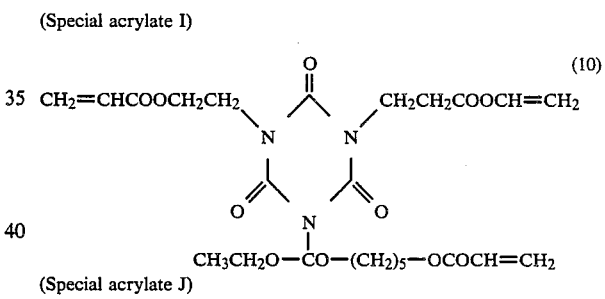

(Special acrylate J)

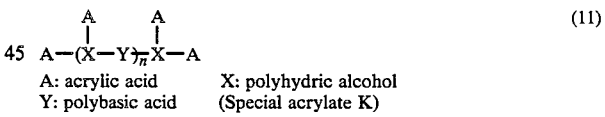

A: acrylic acid   X: polyhydric alcohol
Y: polybasic acid   (Special acrylate K)

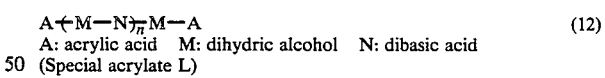

A: acrylic acid   M: dihydric alcohol   N: dibasic acid
(Special acrylate L)

Next, process for the synthesis of the radiation curable binders will be described.

(a) Synthesis of acryl-modified products (radiation sensitive modified resins) of vinyl chloride-vinyl acetate copolymeric resins.

A 5-liter four-necked flask is charged with 750 parts of a partially saponified vinyl chloride-vinyl acetate copolymer having an OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation thereof will be described later) is added and then, 0.012 parts of tin octylate and 0.012 parts of hydroquinone are added. Reaction is continued in a nitrogen stream at 80° C. until the reaction rate of NCO reaches 90%. At the end of reaction, the reaction solution is cooled and 1250 parts of methyl ethyl ketone is added for dilution.

Preparation of 2-hydroxylethyl methacrylate (2HEMA) adduct of tolylenediisocyanate (TDI)

In a 1-liter four-necked flask, 348 parts of TDI is heated at 80° C. in a nitrogen stream. A mixture of 260 parts of 2-ethylene methacrylate, 0.07 parts of tin octylate, and 0.05 parts of hydroquinone is then added dropwise while the reactor is cooled so as to control the temperature to 80° to 85° C. After the dropwide addition, the reaction is continued to completion at 80° C. for 3 hours with stirring. At the end of reaction, the contents are taken out of the flask and cooled, obtaining a white paste-like product which is 2HEMA adduct of TDI based on the preparation method.

(b) Synthesis of acryl-modified products (radiation sensitive modified resins) of butyral resins A 5-liter four-necked flask is charged with 100 parts of a butyral resin (BM-S, manufactured by Sekisui Chemicals K.K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is contunued in a nitrogen stream at 80° C. until the reaction rate of NCO reaches or exceeds 90% At the end of reaction, the reaction solution is cooled and an amount of methyl ethyl ketone is added for dilution.

(c) Synthesis of acryl-modified products (radiation sensitive modified resins) of saturated polyester resins A flask is charged with 100 parts of a saturated polyester resin (Vyron RV-200, manufactured by Toyobo K.K.), 116 parts of toluene, and 116 parts of methyl ethyl ketone. After the flask is heated at 80° C. to dissolve the contents into a solution, 3.55 parts of 2HEMA adduct of TDI (synthesized as above) is added and then, 0.007 parts of tin octylate and 0.007 parts of hydroquinone are added. Reaction is continued in a nitrogen stream at 80° C. until the reaction rate of NCO reaches or exceeds 90%.

(d-1) Synthesis of acryl-modified products (radiation sensitive modified resins) of epoxy resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued at 80° C. until the acid value is lowered to below 5.

(d-2) Synthesis of acryl-modified products (radiation sensitive modified resins) of phenoxy resins A 3-liter four-necked flask is charged with 600 parts of an OH group-bearing phenoxy resin (PKHH manufactured by U.C.C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a nitrogen stream at 80° C. until the reaction rate of NCO reaches or exceeds 90%. The resultant modified phenoxy product has a molecular weight of 35,000 and one double bond per molecule.

(e) Synthesis of acryl-modified products (radiation sensitive modified resins) of urethane elastomers A reactor is charged with 250 parts of a urethane prepolymer of isocyanate-terminated diphenylmethane diisocyanate (MDI) type (Nippolane 3119 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(f) Synthesis of acryl-modified products (radiation sensitive modified elastomers) of terminally urethanemodified polyether elastomers A reactor is charged with 250 parts of a polyether (PTG-500 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(g) Synthesis of acryl-modified products (radiation sensitive modified elastomers) of polybutadiene elastomers A reactor is charged with 250 parts of a low-molecular weight, hydroxyl-terminated polybutadiene (Poly BD Liquid Resin R-15, manuactured by Sinclair Petro-Chemical), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation. Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation-curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

The radiation curing process allows solventless resin compositions to cure within a short time and thus, such solvent-free resin compositions may be conveniently used in the practice of the present invention.

The use of radiation-curable resins prevents a roll of tape having a large diameter known as a jumbo roll from being tightened. Then no substantial difference in electromagnetic properties is induced between the outside and inside coils of the jumbo roll, resulting in improved properties. Besides, productivity is improved since curing can be carried out as an on-line operation in magnetic tape production. A benefit is also obtained for disk-shaped magnetic sheets in that the tendency of sheets curling due to previous storage in wound roll form is prevented.

Preferably, the weight ratio of particulate magnetic material to binder ranges from 1/1 to 9/1, and more preferably from 3/2 to 6/1. Weight ratios of lower than 1/1 result in a low saturation magnetic flux density. At ratios of higher than 9/1, the particulate magnetic material cannot be well dispersed in the binder so that the resulting coating is rough at the surface and brittle.

In the third embodiment of the present invention, it is preferred that the cured binder has a mechanical dissipation factor $\tan\delta$ of up to 0.05 as measured at 20° C. and 10 Hz.

The mechanical dissipation factor used herein is defined in connection with complex elastic modulus as $\tan\delta = E''/E'$ wherein $E'$ is storage or dynamic elastic modulus and $E''$ is loss elastic modulus. The dissipation factor $\tan\delta$ is measured as follows. First, a specimen for measurement is prepared by diluting a binder or binders conforming to the intended binder composition with a suitable solvent such as a mixture of methyl ethyl ketone and toluene to form a lacquer liquid. The lacquer liquid is then coated on a release paper sheet by means of a bar coater and dried to a dry thickness of 30 to 40 μm. The coating is cured or hardened by a suitable curing method using either radiation or heat depending on the particular binder composition used. The thus cured or set film is measured for $\tan\delta$ in a viscoelastometer by a forced vibration method at a driving vibration frequency of 10 Hz (sinusoidal wave), an initial load of 0.25 kg/mm$^2$, and 20° C.

Cured binder films having a $\tan\delta$ of more than 0.05 measured as above show less preferred durability. In the range of $\tan\delta$ of not more than 0.05, the lower the $\tan\delta$, the more is improved the durability.

In a more preferred embodiment, the cured binders have a storage elastic modulus $E'$ of at least 100 kg/mm$^2$ as measured at 40° C. and 10 Hz. The storage elastic modulus $E'$ is measured in the same way as for $\tan\delta$. Namely, the cured or set film prepared by the same procedure is measured for storage elastic modulus in a visco-elastometer by a forced vibration method at a driving vibration frequency of 10 Hz (sinusoidal wave), an initial load of 0.25 kg/mm$^2$, and 40° C.

The durability of the cured binder film is critically increased when the thus measured $E'$ is equal to or higher than 100 kg/mm$^2$.

The binder materials having $\tan\delta$ and $E'$ in the above-specified ranges include thermosetting binders and radiation curable binders.

Additives

A non-reactive solvent may optionally be used in the practice of the present invention. No particular limit is imposed on the non-reactive solvent and a suitable solvent may be chosen by taking into account the solubility of and compatibility with the binder. Some illustrative nonlimiting examples of the non-reactive solvents include ketones such as acetone, methyl ethyl ketone, methyl isobutyl ketone, cyclohexanone, etc.; esters such as ethyl formate, ethyl acetate, butyl acetate, etc.; alcohols such as methanol, ethanol, isopropanol, butanol, etc.; aromatic hydrocarbons such as toluene, xylene, ethylbenzene, etc.; ethers such as isopropyl ether, ethyl ether, dioxane, etc.; and furans such as tetrahydrofuran, furfural, etc., alone or in admixture. The solvents may be used in amounts of 10 to 10,000% by weight, preferably 100 to 5,000% by weight based on the binder.

The magnetic layer may further contain an inorganic pigment. Some illustrative non-limiting examples of the inorganic pigments includes inorganic fillers such as $SiO_2$, $TiO_2$, $Al_2O_3$, $Cr_2O_3$, SiC, CaO, $CaCO_3$, zinc oxide, goethite, $\gamma$-$Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K.K.) and (2) ultrafine anhydrous silicas prepared by pyrolysis of pure silicon tetrachloride (standard product 100 Å; Aerosil manufactured by Nihon Aerosil K.K.). Aluminum oxide, titanium oxide, and the aforementioned finely divided pigments may also be in the form of (1) colloidal solution of ultrafine particles or (2) ultrafine particulates prepared by a gas phase process as mentioned above for silicon dioxide or electrolytically processed product.

These inorganic pigments may be used in amounts of about 1 to 30 parts by weight per 100 parts by weight of the particulate magnetic material. The use of the inorganic pigments in excess amounts results in a brittle coating which produces more dropouts.

The inorganic pigments may preferably have a diameter of up to 0.7 μm, more preferably up to 0.5 μm.

In the practice of the present invention, the need for electroconductive or antistatic agents such as carbon black, graphite and graphitized carbon is eliminated although they may be used in minor amounts.

The magnetic layer may further contain a dispersant. Some illustrative non-limiting examples of the dispersants include organic titanium coupling agents, silane coupling agents, and surface active agents, for example, natural surface active agents also serving as an antistatic agent, such as saponin; nonionic surface active agents such as alkylene oxide, glycerine, and glycidol surface active agents; cationic surface active agents such as higher alkyl amines, quaternary ammonium salts, heterocyclic compounds (e.g. pyridine), phosphoniums and sulfoniums; anionic surface active agents containing an acidic radical such as carboxylic acid, sulfonic acid, phosphoric acid, sulfate ester radicals, and phosphate ester radicals; and amphoteric surface active agents such as amino acids, aminosulfonic acids, sulfates and phosphates of amino alcohols.

The magnetic layer may further contain a lubricant. The lubricants used herein include well-known lubricants commonly used in magnetic recording media of the type, for example, silicone oils, fluoride oils, fatty acids, fatty acid esters, paraffins, liquid paraffins, and various surface active agents, with the fatty acids and/or fatty acid esters being preferred. Some illustrative non-limiting examples of the fatty acids include fatty acids containing at least 12 carbon atoms represented by RCOOH wherein R is an alkyl group having at least 11 carbon atoms, for example, caprylic acid, capric acid, lauric acid, myristic acid, palmitic acid, stearic acid, behenic acid, oleic acid, elaidic acid, linolic acid, linoleic acid, and stearolic acid; and examples of the fatty acid esters include fatty acid esters of a monobasic fatty acid having 12 to 16 carbon atoms with a monohydric alcohol having 3 to 12 carbon atoms and fatty acid esters of a monobasic fatty acid having at least 17 carbon atoms with a monohydric alcohol providing a total of 21 to 23 carbon atoms together with the fatty acid. Also employable are metal soaps in the form of alkali metal (e.g., Li, Na, K) and alkaline earth metal (e.g., Mg, Ca, Ba) salts of the aforementioned fatty acids and lecithin.

Silicones used may be those modified with a fatty acid and those partially modified with fluoride. Alcohols used may be higher alcohols. Fluorides used may be those prepared by electrolytic substitution, teromerization and oligomerization processes.

Among other lubricants, radiation-curable lubricants may conveniently be used. The use of such curable lubricants prevents the transfer of the morphology of the front surface to the rear surface adjoined in roll form, affording some advantages of reduced dropouts, minimized difference in output between the outside and inside coils of a roll of tape, and on-line production.

Examples of the radiation-curable lubricants include compounds containing a molecular chain capable of lubrication and an acrylic double bond in their molecule, for example, acrylates, methacrylates, vinyl acetate, acrylic acid amides, vinyl alcohol esters, methyl vinyl alcohol esters, allyl alcohol esters, glycerides, and the like. These lubricants may be represented by the following structural formulae:

$$CH_2=CHCOOR,$$

$$CH_2=\underset{\underset{CH_3}{|}}{C}-COOR,$$

$$CH_2=CH-CH_2COOR,$$

$$CH_2=CHCONHCH_2COOR,$$

$$\begin{array}{l}CH_2OCOCH=CH_2\\ |\\ CHCOOR\\ |\\ CH_2COOR\end{array},$$

$$RCOO\underset{\underset{CH_3}{|}}{C}=CH_2,$$

$$RCOOCH=CH_2, \quad RCOOCH_2-CH=CH_2, \text{ etc.}$$

wherein R is a straight or branched, saturated or unsaturated hydrocarbon radical having at least 7 carbon atoms, preferably from 12 to 23 carbon atoms.

They may be fluoride substituted lubricants, which may be represented by the following structural formulae:

$$C_nF_{2n+1}-,$$
$$C_nF_{2n+1}(CH_2)_m- \quad \text{where } m = 1-5,$$

$$C_nF_{2n+1}-SO_2\underset{\underset{R}{|}}{N}CH_2CH_2-,$$

$$C_nF_{2n+1}-CH_2CH_2NHCH_2CH_2-,$$

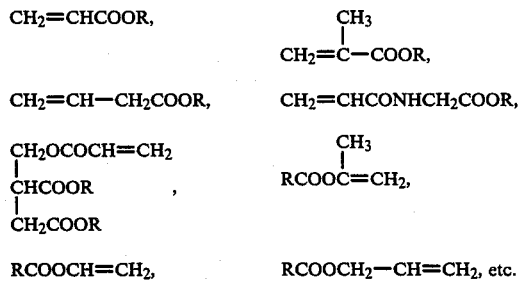

Some preferred examples of these radiation-curable lubricants include stearic acid methacrylate (acrylate), methacrylate (acrylate) of stearyl alcohol, methacrylate (acrylate) of glycerine, methacrylate (acrylate) of glycol, and methacrylate (acrylate) of silicone.

The dispersant and the lubricant each may be used in amounts of about 0.1 to 20 parts by weight per 100 parts by weight of the binder. These lubricants may be added to a magnetic coating composition during dispersion and/or applied to the surface of a magnetic coating as an overcoat.

The magnetic sheet according to the third embodiment of the present invention prefers that a lubricant be present at least on the recording side surface of the magnetic layer. The lubricants on the magnetic layer are effective for reducing the friction between the magnetic sheet and a head during recording and reproducing operations and for improving the durability of the magnetic sheet. The preferred lubricants are fatty acid esters having a melting point of lower than 30° C. and conforming to the general formula: $R^1COOR^2$ wherein $R^1$ is an alkyl radical having 10 to 22 carbon atoms, preferably 12 to 18 carbon atoms, and $R^2$ is an alkyl radical having 3 to 18 carbon atoms, preferably 4 to 16 carbon atoms. They may be used alone or in admixture. Some illustrative examples of the fatty acid esters include butyl laurate, dodecyl laurate, butyl myristate, octyl myristate, isooctyl myristate, isocetyl myristate, butyl palmitate, octyl palmitate, butyl stearate, isobutyl stearate, and isocecyl stearate.

Lubricants in the form of fatty acid esters of the above formula wherein $R^1$ contains less than 10 carbon atoms and/or $R^2$ contains less than 3 carbon atoms tend to scatter away during the high speed rotation of the magnetic sheet because of less firm adherence to the magnetic layer, and thus do not maintain lubrication for an extended period of time. Lubricants in the form of fatty acid esters of the above formula wherein $R^1$ contains more than 22 carbon atoms and/or $R^2$ contains more than 18 carbon atoms or having a melting point of 30° C. or higher are tacky and undesirably tend to transfer and adhere to the head and the stabilizer member, resulting in a rapid loss of lubrication.

In order that the lubricant be present on the surface of the magnetic sheet, any suitable application techniques may be used. A common technique is by dispersing the magnetic powder and the lubricant in the binder and coating the substrate with the dispersion. Alternatively, after a magnetic layer is previously formed on the substrate by coating it with a dispersion of magnetic power in binder, only the lubricant is applied onto the magnetic layer as a topcoat by coating or evaporation. In this case, the lubricant may be locally or entirely distributed over the surface of the magnetic layer, if desired. It is also possible to apply the lubricant as a topcoat in addition to incorporating it in the magnetic layer.

In addition to the above-mentioned lubricants, silicone oil, graphite, molybdenum disulfide, tungsten disulfide, and fatty acid esters of monobasic fatty acids with monohydric alcohols which are outside the presently defined fatty acid esters may also be used as the lubricant.

Any of the additives which are commonly used in the magnetic layer of this type may also be employed in the magnetic layer of the present invention. Such additives include anti-static agents, for example, natural surface-active agents such as saponin; nonionic surface-active agents such as alkylene oxides, glycerins, and glycidols; cationic surface-active agents such as higher alkyl amines, quaternary ammonium salts, pyridine and other heterocyclic compounds, phosphonyl and sulfonyl compounds; anionic surface-active agent such as compounds containing an acid group such as carboxylic acid, sulfonic acid, phosphoric acid, sulfate, and phosphate groups; and amphoteric surface-active agents such as amino acids, aminosulfonic acids, and sulfuric and phosphoric acid esters of aminoalcohols.

Anyway, the magnetic coating composition may contain any suitable additives including the aforementioned antistatic agents, lubricants and dispersants in accordance with their known addition purposes.

The magnetic layer containing particulate magnetic layer and binder typically has a thickness of about 0.1 to 10 $\mu$m. In the case of magnetic sheets, each magnetic layer preferably has a thickness of about 1 to 5 $\mu$m, more preferably about 2 to 4 $\mu$m.

The substrates used herein may include films and plates of plastic materials, for example, polyesters such as polyethylene terephthalate, polyolefines such as polypropylene, cellulose derivatives such as cellulose triacetate, polyimides, polycarbonates, polysulfones, polyethylene naphthalate, aromatic aramides, aromatic polyesters, but not limited thereto. Preferred among these are polyesters, polyamides, and polyimides.

Generally, the magnetic recording medium of the present invention may have two magnetic layers on the opposite major surfaces of a substrate. Typical examples of the double magnetic layer-bearing medium are floppy disks.

If desired, the magnetic recording medium of the presen invention may be provided with an undercoat, a backcoat, and/or a topcoat each formed from a commonly used composition in an ordinary fashion. The backcoat, if formed, may preferably have a composition comprised of a binder, a pigment, and a lubricant.

The undercoat may be interposed between the substrate and the magnetic layer. The undercoat layer may have a composition comprising a thermosetting resin or a radiation-curable compound as previously mentioned and any desired additives such as conductive pigments, inorganic fillers, lubricants, and dispersants or surface active agents. The undercoat layer may be formed by plasma polymerization. It preferably has a thickness of about 10 Å to about 5 $\mu$m and may be of a multi-layered structure.

When a magnetic layer is formed on each major surface of a substrate, the undercoat layer may also be formed on each of the major surfaces. The undercoat is effective in increasing durability particularly when the magnetic layer is less than about 1 $\mu$m thick.

The magnetic recording medium of the present invention may be prepared by any conventional well-known process. More specifically, a magnetic coating composition is first prepared by mixing and dispersing the particulate magnetic material with the binder, organic solvent and any desired additives. The coating composition is applied to a substrate such as a polyester film, which has been provided with an undercoat or treated with a corona discharge or plasma if desired, by any desired techniques such as gravure coating, reverse roll coating, air knife coating, air doctor coating, blade coating, kiss coating, spray coating, and the like. The coating is then dried while being subject to a suitable orienting treatment in a horizontal or vertical magnetic field or s random orienting treatment in a magnetic field capable of offsetting the spontaneous orientation induced during caating process. The coating is cured with heat or radiation depending on the particular type of binder used. Thereafter, a backcoat and/or a topcoat may be applied.

Operation

The operation of magnetic tape is well known in the art and its description is omitted.

The magnetic sheet of the present invention is operated as follows.

As shown in FIG. 1, the magnetic sheet 1 is mounted on and secured to the drive shaft by the chuck 4, and rotated at 3,000 to 3,600 rpm while it is subjected to recording/reproducing operation. During the operation, the magnetic head 3 is advanced in abutment with the sheet 1 while the contact of the sheet with the head is controlled by the stabilizer member 5 opposed to the head 3.

The advanced position of the magnetic head 3 is approximately 0.02 mm to 0.20 mm beyond the reference or originally set level of the magnetic sheet 1 (lower surface in the figure). The stabilizer member 5 is set at a position approximately $-0.1$ mm to $+0.1$ mm apart from the reference level of the magnetic sheet (the upper surface in the figure). The stabilizer recess 51 serving as a sstabilizing surface has a radius of curvature of about 5 mm to 20 mm and a transverse distance of about 5 mm to 20 mm.

According to the first and second embodiment of the present invention, the magnetic layer includes particulate magnetic material which comprises 5 to 90% by weight of iron carbide particles.

Since the iron carbide particles themselves are electrically conductive, they are effective to prevent electrical charging at the tape surface and adhesion of foreign matter on the tape surface which would cause dropout or discharge noise, thus improving tape performance.

Since the iron carbide particles themselves are magnetic, good output and S/N are conferred to the magnetic layer without a loss of magnetization which is inevitable with the addition of carbon black. Since a non-magnetic antistatic agent such as carbon black need not be added or may be added only in minor amounts, there are obtained magnetic disks having high saturation magnetization and high recording density. The disks are also less susceptible to demagnetization and corrosion for the following reason.

Since the iron carbide particles are chemically stable, they are resistant to oxidation, preventing a reduction of magnetic flux density due to ambient conditions such as temperature and humidity as well as preventing deterioration of magnetic and other properties due to rust formation.

The hardness of magnetic iron carbide particles permits the magnetic head to be successively abraded away as the magnetic recording medium passes across the head. Such continuous abrasion of the head prevents seizing and surface roughening as well as output reduction with a lapse of time.

More illustratively, the use of iron carbide particles is successful in significantly improving magnetic properties, particularly residual magnetic flux density and hence, recording density without sacrificing surface smoothness as compared with the use of needle iron oxide. They are also effective in improving magnetic properties, particularly output and S/N in analog recording as compared with cobalt bearing iron oxides. They are also effective in digital recording because an increased output available in saturation recording allows a thinner magnetic layer to produce the same output. The magnetic layer exhibits a high recording density and resolving power.

As compared with the use of magnetic metal powder, many properties of humidity and corrosion resistance, magnetic and electrical reliability, film strength, and friction are improved so that the resulting disk is more durable during drive operation.

When a sensing hole is utilized in 8 inch and 5¼ inch floppy disks, the magnetic disk of the invention is useful because of a hgh degree of blackness and light transmittance meeting the JIS standard. There are thus obtained magnetic disks useful as floppy disks, still video floppy disks and the like.

EXAMPLES

In order that those skilled in the art will fully understand the practice of the present invention, examples of the present invention are presented below together with comparative examples. They are intended to further illustrate the invention and not for limitation. In the Examples, MEK is methyl ethyl ketone, MIBK is methyl isobutyl ketone.

EXAMPLE 1

Magnetic coating compositions were prppared from the following ingredients.

| Ingredients | Parts by weight |
| --- | --- |
| Particulate magnetic material | 120 |
| α-Al$_2$O$_3$ (powder, particle size 0.5 μm) | 5 |
| Solvent, 50/50 MEK/toluene | 100 |

The ingredients were milled in a ball mill for 3 hours to fully wet the magnetic particles.

The particulate magnetic materials used were mixtures of particles having Fe$_n$C at least on the surface thereof (to be simply referred to as Fe$_n$C powder) and cobalt-coated iron oxide particles (to be simply referred to as Co-γ-Fe$_2$O$_3$ powder) in varying proportion (weight ratio) as shown in Table 1.

TABLE 1

| Particulate magnetic material | Needle Fe$_n$C | Co—γ-Fe$_2$O$_3$ |
| --- | --- | --- |
| MP1 (comparison) | 100 | 0 |
| MP2 (comparison) | 95 | 5 |
| MP3 | 80 | 20 |
| MP4 | 50 | 50 |
| MP5 | 15 | 85 |

The needle Fe$_n$C powder was prepared by heating needle α-FeOOH in a gas mixture of CO and H$_2$ in a ratio of 3:7 in an electric oven at 350° C. for 5 hours. The product was observed by X-ray diffraction analysis to be a mixed crystal of Fe$_3$C and Fe. This powder had a coercive force Hc of 900 to 910 Oe and a saturation magnetization vs of 82 emu/g.

The Co-γ-Fe$_2$O$_3$ powder was comprised of γ-Fe$_2$O$_3$ particles having divalent cobalt cation diffused into a very thin surface layer of less than several ten angstroms from their surface. This powder had a coercive force Hc of 750 Oe.

A binder composition B1 was separately prepared by thoroughly mixing the following ingredients into a solution.

| Ingredients | Parts by weight |
| --- | --- |
| (a) Vinyl chloride-vinyl acetate-vinyl alcohol copolymer (maleic acid content 1%, MW 40,000) | 8 (solids) |
| (b) Acrylic double bond incorporated vinyl chloride-vinyl acetate copolymer (maleic acid content 1%, MW 20,000) | 10 (solids) |
| (c) Acrylic double bond incorporated polyether urethane elastomer (MW 40,000) | 9 (solids) |
| (d) Pentaerythritol triacrylate | 3 |
| (e) Solvent (50/50 MEK/toluene) | 200 |
| (f) Stearic acid | 4 |
| (g) Butyl stearate | 2 |

The binder composition B1 was admitted into the ball mill containing the magnetic particle mixture and milled for dispersion for a further 42 hours.

The thus obtained magnetic coating composition was applied onto a polyester film by gravure coating, subjected to orientation, heated under far-infrared lamps or with hot air to evaporate off the solvent, and then surface smoothened.

The magnetic coating was then cured by exposing it to electron radiation in a nitrogen atmosphere by means of an electron-curtain type radiation accelerator (manufactured by ESI Company) operating at an accelerating voltage of 150 keV and an electrode current of 20 mA to a total dose of 5 Mrad. The cured coating or magnetic layer was 2 μm thick. The coating thickness was measured by means of an electron micrometer.

After finishing to a mirror surface, standard magnetic tapes were formed by cutting the coated film to the video tape width.

For comparison purposes, additional video tape samples were prepared by repeating the same procedure as above except that the particulate magnetic material in the magnetic coating composition was changed as shown in Table 2.

TABLE 2

| Particulate magnetic material | Needle Fe$_n$C | Co—γ-Fe$_2$O$_3$ | Needle Fe |
| --- | --- | --- | --- |
| MP6 (comparison) | — | 100 | — |
| MP7 (comparison) | — | — | 100 |

The needle Fe particles were prepared by reducing needle α-FeOOH with hydrogen, having an average particle length of 0.2 μm, an aspect ratio of 8, a coercive force Hc of 900 Oe, and a saturation magnetization vs of 155 emu/g.

When the particulate magnetic materials MP6 and MP7 were used, 30 parts by weight of carbon black having an average particle size of 20 mμ was added to 120 parts by weight of the particulate magnetic material.

The thus obtained magnetic tape samples were measured for the following properties.

(1) Magnetic properties

Magnetic properties including coercive force Hc, maximum saturation magnetization s, and rectangular ratio Br/Bm were measured by means of a vibration-type fluxmeter.

(2) RF output

A VCR deck having mounted a Sendust head (gap 0.28 μm, winding 20 turns, track width 26 μm) was loaded with tape and operated at a head-tape relative speed of 3.75 m/sec. An output at 5 MHz was measured.

(3) Chroma output

Using the same head as in (2), a chroma output at 0.75 MHz was measured at a head-tape relative speed of 3.75 m/sec.

(4) Head abrasion

The magnetic tape was run for 100 hours in a laboratory using a VTR deck (Model CCDV8 manufactured by SONY Corporation, Japan) having the same head as in 2). At the end of 100 hour run, a thickness loss of the head due to abrasion was measured.

(5) Electric resistivity ($\Omega/cm^2$)

A specimen of 100 mm wide by 100 mm long was cut from each lot. It was placed in a superinsulating resistor having a main electrode outside diameter of 50 mm, and guard electrode outside and inside diameters of 80 mm and 70 mm, respectively. With a DC voltage of 500 volts applied, the resistivity was measured in an ambient atmosphere at a temperature of 20°±2° C. and a relative humidity of 65±5%.

(6) Dropout increase

A VTR deck was loaded with a tape sample and operated over 100 passes and consecutively over 200 passes. Both at the end of 100 and 200 passes, dropouts per minute were counted. Dropout increase is a percentage increase of these counts.

(7) Oxidation resistance

Oxidation resistance was determined by measuring the residual magnetic flux density Br of the magnetic tape before and after the tape was aged for 7 days at a relative humidity of 98% and a temperature of 60° C. and computing a percentage reduction of residual magnetic flux density ΔBr.

(8) Head seizing

Head seizing was determined by moving the magnetic tape across an amorphous magnetic head in a commercial VHS video deck at a relative speed of 5.8 m/sec. for 20 hours in a laboratory, and observing the head under a microscope for discoloration. The head was evaluated according to the following criterion.

HEAD SEIZING

O: no discoloration
Δ: partially discolored
X: totally discolored

The results are shown in Table 3.

TABLE 3

| Sample No. | Hc (Oe) | Ms (emu/cc) | Br/Bm | ΔBr (%) | RF output (μVp-p) | Chroma output (μVp-p) | Head seizing | Head abrasion (μm) | Resistivity ($\Omega/cm^2$) | % Increase of dropouts (200/100 passes) |
|---|---|---|---|---|---|---|---|---|---|---|
| 101* | 900 | 200 | 0.74 | −6.8 | 140 | 490 | Δ | 1.0 | $1 \times 10^6$ | 70 |
| 102* | 900 | 195 | 0.74 | −6.0 | 140 | 490 | Δ | 1.0 | $1 \times 10^6$ | 70 |
| 103 | 850 | 183 | 0.74 | −2.5 | 135 | 470 | O | 2.0 | $1 \times 10^7$ | 30 |
| 104 | 830 | 175 | 0.74 | −1.0 | 130 | 450 | O | 2.5 | $6 \times 10^8$ | 20 |
| 105 | 800 | 160 | 0.74 | −0.5 | 110 | 410 | O | 3.0 | $1 \times 10^9$ | 15 |
| 106* | 770 | 130 | 0.74 | −0.2 | 50 | 300 | O | 5.0 | $1 \times 10^{11}$ | 10 |
| 107* | 1350 | 240 | 0.73 | −8.0 | 200 | 500 | X | 0.5 | $1 \times 10^8$ | 100 |

*comparison

As seen from Table 3, the present samples exhibit excellent oxidation resistance as demonstrated by ΔBr of less than 3%. They produce practically favorable outputs as demonstrated by an RF output of 100 μVp-p or higher and a chroma output of 400 μVp-p or higher. They are free of head seizing and abrade away the head to a lesser extent. They have an electric resistivity of up to $1 \times 10^{10}$ $\Omega/cm^2$ and experience a least dropout increase after a number of passes.

On the contrary, the comparative samples fail to clear the practical level in either of these properties.

EXAMPLE 2

Video tape samples were prepared by repeating the procedure of Example 1 except that a magnetic coating composition was formulated from another binder composition B2 as defined below and cured after coating at 80° C. for 48 hours. The magnetic layer was 2 μm thick.

The binder composition B2 was prepared by thoroughly mixing the following ingredients into a soluiion.

| Ingredients | Parts by weight |
|---|---|
| (a) Vinyl chloride-vinyl acetate-vinyl alcohol copolymer (UCARMAG 528 manufactured by Union Carbide) | 15 (solids) |
| (b) Urethane (Nippolan 3022 manufactured by Nihon Polyurethane K.K.) | 15 (solids) |
| (c) Solvent (50/50 MEK/cyclohexanone) | 200 |
| (d) Higher fatty acid-modified silicone oil | 3 |
| (e) Butyl myristate | 3 |

After dispersion, 5 parts by weight (calculated as solids content) of an isocyanate compound (Colonate L manufactured by Nippon Polyurethane K.K.) was added to the magnetic coating composition.

The thus prepared video tape samples were evaluated for the same properties by the same methods as in Example 1. There were obtained equivalent results.

EXAMPLE 3

A polyester (PET) sheet of 75 μm thick was coated on its face and back surfaces with a magnetic coating composition as shown below. A series of samples having a magnetic layer on either surface were prepared.

Magnetic coating compositions were prepared from the following ingredients.

| Ingredients | Parts by weight |
| --- | --- |
| Particulate magnetic material | 120 |
| α-Al$_2$O$_3$ (powder, particle size 0.5 μm) | 2 |
| Solvent, 50/50 MEK/toluene | 100 |

The ingredients were milled in a ball mill for 3 hours to fully wet the magnetic particles.

The particulate magnetic materials used were mixtures of needle Fe$_n$C powder and needle Fe powder in a varying weight ratio as shown in Table 4. These powders were the same as used in Example 1.

TABLE 4

| Sample No. | Needle Fe$_n$C | Needle Fe |
| --- | --- | --- |
| 301 (comparison) | 100 | — |
| 302 (comparison) | 95 | 5 |
| 303 | 80 | 20 |
| 304 | 50 | 50 |
| 305 | 30 | 70 |
| 306 (comparison) | — | 100 |

For sample No. 306 only, the coating composition further contained 10 parts by weight of carbon black (20 mμ).

The same binder composition B1 as used in Example 1 was admitted into the ball mill containing the magnetic particle mixture and milled for dispersion for a further 42 hours.

The thus obtained magnetic coating composition was applied onto a polyester sheet by gravure coating under random orientation conditions, heated under far-infrared lamps or with hot air to evaporate off the solvent, and then surface smoothened.

The magnetic coating was then cured by exposing it to electron radiation in a nitrogen atmosphere by means of an electron-curtain type radiation accelerator (manufactured by ESI Company) operating at an accelerating voltage of 150 keV and an electrode current of 20 mA to a total dose of 5 Mrad. The cured coating or magnetic layer was 1.0 μm thick. The coating thickness was measured by means of an electron micrometer.

The coatings were formed on both the surfaces of each sheet, yielding a double-sided sheet.

The coated sheet was processed into products having the size and configuration of the 3.5-inch floppy disk and measured for various properties. Evaluation of the properties is given below.

(1) Magnetic properties

Measurements are the same as in Example 1.

(2) Linear recording density D50 (KFRPI)

The disk was operated at 300 revs/min. with respect to a ferrite head having a gap of 0.3 μm. A linear recording density D50 (KFRPI) was measured at which an output E in a low recording density region is reduced to E/2 in a high recording density region.

(3) 40 KFRPI output

An output at 40 KFRPI was measured in the same manner as in (2). Using sample No. 306 as the control, a relative value of each sample was determined.

(4) Resolving power

In the aforementioned measurement of linear recording density D50, a resolving power given as 64 KFRPI/16 KFRPI was calculated.

Using sample No. 310 of Example 4 to be described later as the standard having a value of 100%, a relative value of each sample was determined in %.

(5) Electric resistivity (Ω/cm$^2$)

Measurement is the same as in Example 1.

(6) Durability

The number of passes was counted until the 1F signal output was reduced by 3 dB under an environment at 20° C. and RH 60%.

(7) Oxidation resistance

Oxidation resistance was determined by measuring the saturation magnetic flux density φm of the magnetic disk before and after the disk was aged for 7 days at a relative humidity of 90% and a temperature of 60° C. and computing a percentage reduction of saturation magnetic flux density Δφm (%).

The results are shown in Table 5.

TABLE 5

| Sample No. | Hc (Oe) | Br (G) | Thickness (μm) | D$_{50}$ KFRPI | 40 KFRPI output (dB) | Resolving power (64K/16K, %) | Resistivity (Ω/cm$^2$) | Durability (× 10$^5$ passes) | Δφm (%) |
| --- | --- | --- | --- | --- | --- | --- | --- | --- | --- |
| 301* | 850 | 1000 | 1.0 | 52 | −2.0 | 110 | 1 × 10$^8$ | ≧2000 | −0.8 |
| 302* | 860 | 1050 | 1.0 | 55 | −1.8 | 116 | 2 × 10$^8$ | ≧2000 | −0.8 |
| 303 | 910 | 1150 | 1.0 | 68 | 0.8 | 130 | 6 × 10$^8$ | ≧2000 | −1.0 |
| 304 | 950 | 1370 | 1.0 | 75 | 1.5 | 152 | 7 × 10$^9$ | ≧2000 | −2.3 |
| 305 | 960 | 1490 | 1.0 | 72 | 2.0 | 144 | 1 × 10$^{10}$ | ≧2000 | −2.6 |
| 306* | 970 | 1520 | 1.0 | 70 | 0 | 120 | 5 × 10$^{10}$ | 900 | −3.2 |
| 313 | 920 | 1350 | 1.0 | 73 | 1.5 | 149 | 7 × 10$^9$ | ≧2000 | −2.1 |

*comparison

EXAMPLE 4

Sample Nos. 307 to 312 were prepared by repeating the procedure of Example 3 except that the particulate magnetic material was replaced by magnetic powder mixtures of varying mixing ratio as shown in Table 6.

TABLE 6

| Sample No. | Needle Fe$_n$C | Co—γ-Fe$_2$O$_3$ | Ba—Fe$_{12}$O$_{19}$ |
| --- | --- | --- | --- |
| 307 | 70 | 30 | — |
| 308 | 50 | 50 | — |
| 309 | 30 | 70 | — |
| 310 (comparison) | — | 100 | — |
| 311 | 30 | — | 70 |
| 312 (comparison) | — | — | 100 |

For (comparative) sample Nos. 310 and 312 only, 10 parts by weight of carbon black having an average particle size of 20 mμ was added to 120 parts by weight of the particulate magnetic material.

The Co-γ-Fe$_2$O$_3$ powder used was comprised of γ-Fe$_2$O$_3$ particles having divalent cobalt cation diffused into a very thin surface layer of less than several ten angstroms from their surface. This powder had a coercive force Hc of 750 Oe.

The Ba-Fe$_{12}$O$_{19}$ powder used was hydrothermally synthesized from Ba-Fe$_{12}$O$_{19}$ through partial substitution of Ba and Fe.

Sample Nos. 307 to 312 were processed into products having the size and configuration of the 3.5-inch floppy disk and measured for various properties in the same procedures as in Example 3. There were obtained results shown in Table 7.

The binder composition B3 was prepared by thoroughly mixing the ingredients into a solution.

After dispersion, 5 parts by weight (calculated as solids content) of an isocyanate compound (Colonate L manufactured by Nippon Polyurethane K.K.) was

TABLE 7

| Sample No. | Hc (Oe) | Br (G) | Thickness (μm) | $D_{50}$ KFRPI | 40 KFRPI output (dB) | Resolving power (64K/16K, %) | Resistivity (Ω/cm²) | Durability (× $10^5$ passes) | Δφm (%) |
|---|---|---|---|---|---|---|---|---|---|
| 301* | 850 | 1000 | 1.0 | 52 | −2.0 | 110 | $1 \times 10^8$ | ≧2000 | −0.8 |
| 307 | 850 | 1220 | 1.0 | 60 | 0.5 | 143 | $2 \times 10^8$ | ≧2000 | −0.6 |
| 308 | 850 | 1010 | 1.0 | 71 | 0.2 | 131 | $5 \times 10^9$ | ≧2000 | −0.6 |
| 309 | 850 | 850 | 1.0 | 58 | −1.0 | 120 | $8 \times 10^9$ | ≧2000 | −0.5 |
| 310* | 850 | 720 | 1.0 | 40 | −6.0 | 100 | $8 \times 10^{10}$ | ≧2000 | −0.5 |
| 311 | 800** | 850** | 2.0 | 75 | −0.5 | 136 | $5 \times 10^{10}$ | ≧2000 | −0.8 |
| 312* | 830** | 750** | 2.0 | 75 | −2.5 | 120 | $8 \times 10^{15}$ | 1400 | −0.4 |

*comparison
**Hc and Br values in a direction perpendicular to the magnetic layer surface

EXAMPLE 5

A polyester (PET) sheet of 75 μm thick was coated on its face and back surfaces with an undercoating composition as shown below.

| Undercoat | |
|---|---|
| Ingredients | Parts by weight |
| Carbon black (particle size 20 mμ) | 50 |
| (A) Acryl-modified vinyl chloride-vinyl acetate-vinyl alcohol copolymer (MW 45,000) | 45 |
| (B) Acryl-modified polyurethane elastomer (MW 5,000) | 45 |
| (C) Pentaerythritol triacrylate | 10 |
| Stearic acid | 2 |
| Butyl stearate | 2 |
| Solvent (1/1 MIBK/toluene) | 300 |

The ingredients were milled for dispersion in a ball mill for 5 hours. The resulting undercoating composition was applied to the PET sheet and smoothened on the surface. The undercoat was then cured by exposing it to electron radiation in a nitrogen atmosphere by means of an electron-curtain type radiation accelerator operating at an accelerating voltage of 150 keV and an electrode current of 10 mA to a total dose of 55 Mrad. The cured undercoat was 3 μm thick. The double-undercoated substrate was then coated on both the surfaces with a magnetic coating composition by the same procedure as in Example 3 except that a particulate magnetic material mixture of needle $Fe_nC$ and Fe powders having the weight ratios shown below and a binder composition B3 as formulated below were used.

| Particulate magnetic material (part by weight) | | |
|---|---|---|
| Sample No. | Needle $Fe_nC$ | Needle Fe |
| 313 | 50 | 50 |

| Binder Composition B3 | |
|---|---|
| Ingredients | Parts by weight |
| Nitrocellulose (alcohol free) (Celline manufactured by Dicell Industry K.K.) | 18 (solids) |
| Urethane (Nippolan 3022 manufactured by Nihon Polyurethane K.K.) | 12 (solids) |
| Solvent (70/30 MEK/cyclohexanone) | 200 |
| Stearic acid | 3 |
| Butyl myristate | 3 | added to the magnetic coating composition.

The thus obtained magnetic coating composition was applied onto a polyester sheet of 75 μm thick by gravure coating under random orientation conditions, heated under far-infrared lamps or with hot air to evaporate off the solvent, and then surface smoothened.

The magnetic coating was then cured by heating at 80° C. for 48 hours. The cured coating or magnetic layer was 2 μm thick.

The coatings weee formed on both the surfaces of each sheet, yielding a double-sided sheet.

The coated sample No. 313 was processed into products having the size and configuration of the 3.5-inch floppy disk and measured for various properties.

The results are reported in Table 5.

EXAMPLE 6

Magnetic coating compositions were prepared from the following ingredients.

| Ingredients | Parts by weight |
|---|---|
| (a) Particulate magnetic material | 300 |
| (b) Acrylic double bond incorporated vinyl chloride-vinyl acetate-vinyl alcohol copolymer (containing maleic acid, MW 40,000) | 180 |
| (c) Acrylic double bond incorporated polyester urethane elastomer (MW 30,000) | 60 |
| (d) Acrylic double bond incorporated polyester urethane elastomer (MW 5,000) | 15 |
| (e) Pentaerythritol triacrylate | 45 |
| (f) α-$Al_2O_3$ | 6 |
| (g) Solvent (50/50 MEK/toluene) | 700 |
| (h) Stearic acid | 4 |
| (i) Isocetyl stearate | 2 |

The ingredients were milled in a ball mill for 45 hours to fully wet the magnetic particles.

The particulate magnetic materials used were mixtures of particles having $Fe_nC$ at least on the surface thereof ($Fe_nC$ powder) and needle particles of ferromagnetic Fe alloy having a length of 0.3 μm, a breadth of 0.04 μm, and Hc=1500 Oe or cobalt-coated iron oxide particles (Co-γ-$Fe_2O_3$ powder) having a length of 0.3 μm, a breadth of 0.04 μm, and Hc=600 Oe in varying proportion (weight ratio) as shown in Table 8. The needle $Fe_nC$ powder used was the same as in Example 1. The total weight of the mixture is 100 parts by weight.

TABLE 8

| Particulate magnetic material | Needle Fe$_n$C | Needle Fe alloy | Co—γ-Fe$_2$O$_3$ |
|---|---|---|---|
| MP601 | 90 | 10 | — |
| MP602 | 50 | 50 | — |
| MP603 | 30 | 70 | — |
| MP604 | 10 | 90 | — |
| MP605 | — | 100 | — |
| MP606 | 50 | — | 50 |
| MP607 | — | — | 100 |

The thus obtained magnetic coating composition was applied onto the opposed surfaces of a polyester base film of 34 μm by gravure coating, dried with hot air to evaporate off the solvent, surface smoothened by calendering, and then cured by electron radiation at a dose of 5 Mrad. Each of the magnetic layers had a thickness of 3 μm after drying.

The resulting sheet was stamped into a circular disk having a diameter of 47 mm, obtaining sample Nos. 601 to 607.

EXAMPLE 7

The procedure of Example 6 was repeated except that the binder composition of radiation curable type was replaced by a thermosetting binder of the following composition.

| Ingredients | Parts by weight |
|---|---|
| Vinyl chloride-vinyl acetate-vinyl alcohol copolymer (MW 35,000) | 120 |
| Polyester urethane elastomer (MW 30,000) | 120 |
| Polyisocyanate (MW 700) | 60 |

With this change of binder, the amount of solvent was reduced to 200 patts by weight and the coating was cured by heating at 60° C. for 24 hours instead of electron radiation.

The resulting sheet was blanked to form a circular disk having a diameter of 47 mm, obtaining sample Nos. 701 to 705.

The disks were evaluated for the following properties.

(1) Durability

In a durability test, the disks containing 50 tracks were continuously reproduced at 7 MHz under the optimum head contact conditions. A variation of reproduced outputs from 25 tracks among the 50 tracks was measured. The lapse of time until the output was reduced by 3 dB was considered as a durable life.

The head used is a ferrite head having a width of 2 mm, a thickness of 120 μm, and a gap of 0.3 μm. Upon reproduction, the head was advanced 0.02 to 0.1 mm beyond the reference level of the disk. The disk was rotated at 3,600 rpm. The stabilizer member was located 0.01 mm apart from the disk. The stabilizer recess had a radius of curvature of 10 mm and a transverse distance of 10 mm.

(2) Surface electric resistance (Ω)

A specimen of 100 mm wide by 100 mm long was placed in a superinsulating resistor having a main electrode outside diameter of 50 mm, and guard electrode outside and inside diameters of 80 mm and 70 mm, respectively. With a DC voltage of 500 volts applied, the resistance was measured in an ambient atmosphere at a temperature of 20°±2° C. and a relative humidity of 65±5%. The surface resistance R in ohm is calculated according to the formula:

$$R = 1.83 \times (E/I)$$

where E is the applied voltage in volt and I is the current in ampere.

TABLE 9

| Sample No. | Particulate magnetic material | Durable life (hour) | Electric resistance (Ω) |
|---|---|---|---|
| 601 | MP601 | 345 | $\leq 10^6$ |
| 602 | MP602 | 510 | $\leq 10^6$ |
| 603 | MP603 | 545 | $5.7 \times 10^7$ |
| 604 | MP604 | 373 | $4.3 \times 10^9$ |
| 605* | MP605 | 210 | $1.2 \times 10^{11}$ |
| 606 | MP606 | 575 | $3.2 \times 10^8$ |
| 607* | MP607 | 329 | $5.0 \times 10^{13}$ |
| 701 | MP601 | 337 | $\leq 10^6$ |
| 702 | MP602 | 490 | $\leq 10^6$ |
| 703 | MP603 | 482 | $6.3 \times 10^7$ |
| 704 | MP604 | 273 | $7.2 \times 10^9$ |
| 705* | MP605 | 187 | $4.1 \times 10^{11}$ |

*comparison

We claim:

1. A magnetic recording medium comprising a substrate and a magnetic layer formed thereon and containing a particulate magnetic material and a radiation curable binder, characterized in that
   the particulate magnetic material comprises (a) magnetic particles having iron carbide of the formula: Fe$_n$C where n is a number of at least 2 at least on the surface thereof and (b) oxide particles, and the particulate magnetic material contains 5 to 90% by weight of iron carbide.

2. A magnetic recording medium comprising a disk-shaped flexible substrate and a magnetic layer formed thereon and containing a particulate magnetic material formed thereon and containing a particulate magnetic material and a radiation curable binder, characterized in that
   the particulate magnetic material comprises magnetic particles having iron carbide of the formula: Fe$_n$C where n is a number of at least 2 at least on the surface thereof and contains 5 to 90% by weight of iron carbide.

3. A magnetic recording medium according to claim 2 wherein the particulate magnetic material further comprises at least one member selected from the group consisting of magnetic metal particles, gamma-iron oxide particles, cobalt-coated iron oxide particles, barium ferrite particles, and strontium ferrite particles, and mixtures thereof.

* * * * *

UNITED STATES PATENT AND TRADEMARK OFFICE
CERTIFICATE OF CORRECTION

PATENT NO. : 4,794,042
DATED : Dec. 27, 1988
INVENTOR(S) : Yuichi KUBOTA et al.

It is certified that error appears in the above-identified patent and that said Letters Patent is hereby corrected as shown below:

On the Title Page:

"Attorney, Agent or Firm" should be corrected to read:

-- Oblon, Fisher, Spivak, McClelland & Maier --

There is only one drawing sheet, not two.

Signed and Sealed this

Twentieth Day of June, 1989

*Attest:*

DONALD J. QUIGG

*Attesting Officer*  *Commissioner of Patents and Trademarks*